United States Patent [19]

Lutz

[11] Patent Number: 5,728,936
[45] Date of Patent: Mar. 17, 1998

[54] ROTARY SPEED SENSOR

[75] Inventor: Markus Lutz, Reutlingen, Germany

[73] Assignee: Robert Bosch GmbH, Stuttgart, Germany

[21] Appl. No.: 700,732

[22] Filed: Aug. 15, 1996

[30] Foreign Application Priority Data

Aug. 16, 1995 [DE] Germany ............ 1 95 30 007.6

[51] Int. Cl.$^6$ ............................................. G01P 9/04
[52] U.S. Cl. ................................. 73/504.14; 73/504.12
[58] Field of Search ........................ 73/504.12, 504.14, 73/504.15, 504.16, 504.04

[56] References Cited

U.S. PATENT DOCUMENTS 5,359,893  11/1994  Dunn ......................... 73/504.12
5,396,797  3/1995   Hulsing ...................... 73/504.04
5,610,334  3/1997   Fima et al. .................. 73/504.12

FOREIGN PATENT DOCUMENTS 0 539 393  5/1993   European Pat. Off. .
0 572 976  12/1993  European Pat. Off. .
0 664 438  7/1995   European Pat. Off. .

Primary Examiner—John E. Chapman
Attorney, Agent, or Firm—Frishauf, Holtz, Goodman, Langer & Chick, P.C.

[57] ABSTRACT

A rotary speed sensor including an oscillator that can be excited to oscillate in a first direction (X direction). Upon a rotation about the Z axis, Coriolis forces in a second direction (Y direction) occur on the oscillator. The Coriolis forces are transmitted by oscillator springs to a detection element, where they can be detected from the deflection of movable electrodes.

11 Claims, 4 Drawing Sheets

1

ROTARY SPEED SENSOR

FIELD OF THE INVENTION

The invention is directed to a rotary speed sensor and, in particular, one which oscillates in the X-direction and is rotatable around the Z-axis to create Coriolis forces in the Y-direction to produce a measurable Y-deflection indicative of rotational speed.

BACKGROUND OF THE INVENTION

European Patent Disclosure EP 539 393 B1 discloses an acceleration sensor in which an oscillator can be excited to oscillate in a first direction. Upon rotation of the sensor about an axis that is perpendicular to the direction of oscillation, Coriolis forces occur which cause a deflection of the oscillator. The oscillator is a plate of a plate capacitor, the capacitance of which varies as a result of the deflection. The measurement signal resulting from the deflection and the sensitivity of this arrangement are strongly influenced by production tolerances.

SUMMARY OF THE INVENTION

A primary object of the invention is to provide an improved rotary speed sensor.

Another object of the invention is to provide a rotary speed sensor which is minimally influenced by production tolerances.

These and other objects of the invention are attained by a rotary speed sensor having at least one oscillator (1) and a substrate (21), wherein the oscillator can be excited to perform oscillations relative to the substrate in a first direction (X direction). Upon a rotation of the oscillator, it can be deflected by incident Coriolis forces in a second direction (Y direction) that is perpendicular to the first direction. The oscillator (1) is coupled by at least one elastic element (2) to at least one detection element (3), wherein the elastic element (2) has a low spring constant in the first direction (X) and a high spring constant in the second direction (Y). At least two deflection springs (9) anchor the at least one detection element (3) to the substrate (21), wherein the deflection springs (9) have a high spring constant in the first direction (X) and a low spring constant in the second direction (Y).

The rotary speed sensor according to the invention has the advantage over the prior art that the Coriolis forces are detected by a detection element provided specifically for that purpose. The oscillator and the detection element are connected by an elastic element, which essentially transmits only the Coriolis forces. The detection element can, therefore, be optimized independently of the oscillator for detecting the Coriolis forces.

Another advantageous feature can be attained by suspending the detection element from deflection springs that have a high spring constant in the first direction, so that motions of the detection element in the oscillation direction are suppressed. Since the detection element is thus movable substantially only in the second direction, the influence of production tolerances on the sensitivity of the detection element is only slight. The detection element has movable electrodes which form a plate capacitor with stationary electrodes. Such detection elements have high sensitivity. The excitation of the oscillations of the oscillator is effected by means of an electrostatic drive. Because of its low thermal expansion, silicon is still especially well suited as a substrate material to which elements of the sensor are secured. The sensors can also be readily produced from silicon or metal. By using a plurality of oscillators coupled together, the signal of the rotary speed sensors can be increased or noise factors suppressed.

DETAILED DESCRIPTION OF THE PREFERRED EMBODIMENT(S)

Figure 1:
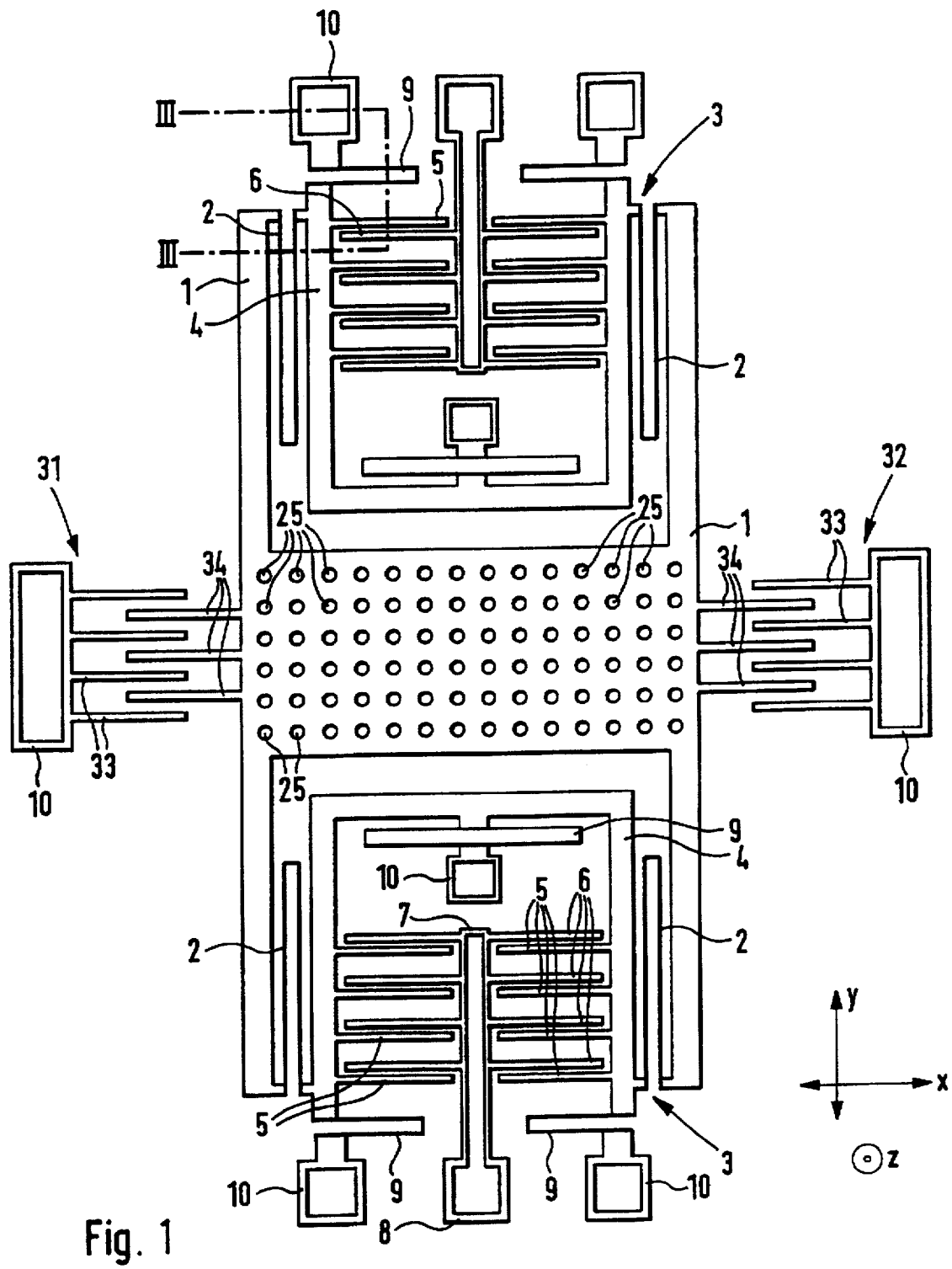
FIG. 1 is a plan view of a first exemplary embodiment of the rotary speed sensor of the invention.

In FIG. 1, a plan view of the rotary speed sensor according to the invention shows an oscillator 1 that is suspended from four oscillator springs 2. The oscillator springs 2 are embodied as elongated, U-shaped elements. The springs 2 have only a low spring constant in the X direction and, thus, can easily be deformed by forces in a direction along the X axis. Because of the low spring constant of the oscillator springs 2 in the X direction, the oscillator 1 can thus be readily excited to oscillate by forces applied in the X direction. However, in the direction of the Y axis, which is perpendicular to the X axis, the oscillator springs 2 have a comparatively high spring constant. If forces in the Y direction are applied to the oscillator 1, they are transmitted via the oscillator springs 2 to whatever springs 2 are connected. The oscillator springs 2 are connected to, or suspended from, an evaluation element 3.

The evaluation element 3 comprises a movable frame 4, to which the oscillator springs 2 are secured, as well as movable electrodes 5 and stationary electrodes 6. The stationary electrodes are connected via a central bar 7 to an anchoring means 8. The anchoring means 8 is secured firmly to a substrate 21 (see FIG. 3). The movable electrodes 5 are secured to the frame 4. The frame 4 is connected via deflection springs 9 to anchoring means 10. The anchoring means 10 are likewise firmly secured to the substrate 21. The deflection springs 9 have only a low spring constant in the Y direction. By comparison, the spring constant of deflection springs 9 in the X direction is high. The frame 4 can thus be moved by comparatively small forces in the Y direction, while forces in the X direction cause only a slight motion of the frame 4. Upon a motion of the frame 4 in the Y direction, the movable electrodes 5 secured to the frame are moved as well. The stationary electrodes 6, however, are fixed to the substrate 21 by the central bar 7 and the anchoring means 8 and are, therefore, not moved relative to the substrate.

Figure 2:
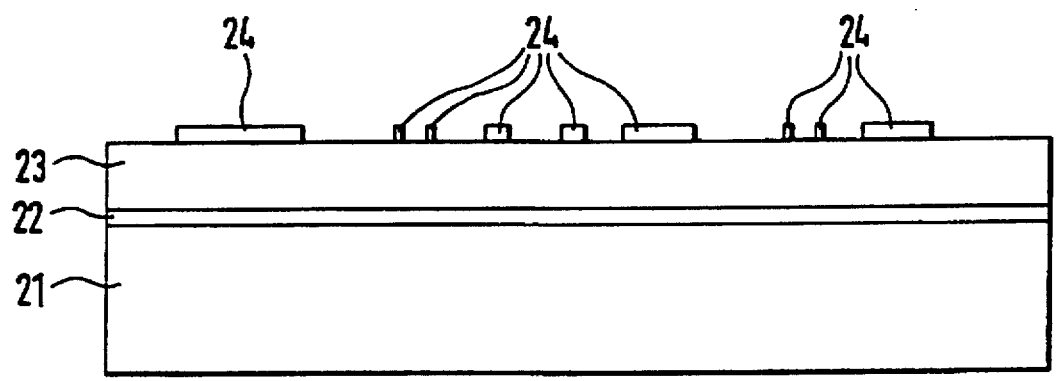
FIG. 2 is a cross section through the sensor of FIG. 1 taken alone line III—III, but for an intermediate step in the production of the sensor.
Figure 3:
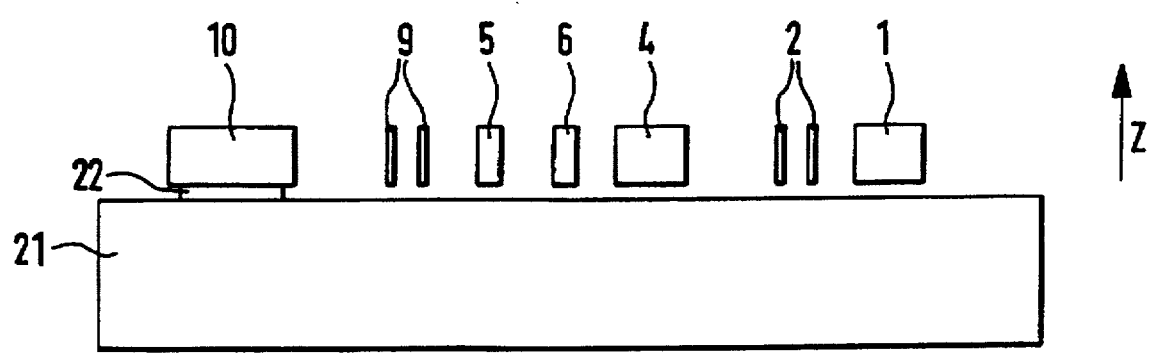
FIG. 3 is a cross section through the sensor of FIG. 1, taken along the line III—III.

In FIG. 3, a cross section along the line III—III of FIG. 1 is shown. This is a cross section through an anchoring means 10, deflection spring 9, one movable electrode 5, one stationary electrode 6, the movable frame 4, oscillator spring 2, and the oscillator 1. The anchoring means 10 is fixed to the substrate 21 by an intermediate layer 22. The other elements shown in FIG. 2 are not attached directly to the substrate and are, therefore, displaceable relative to the substrate 21. It should be noted here that it is also possible for the stationary electrode 6 to be fixed to the substrate by a layer 22. Because of their relatively large thickness in the Z direction compared to their width in the perpendicular direction (i.e. X or Y), the oscillator spring 2 and deflection springs 9 are capable of absorbing strong forces in the Z direction without undergoing significant deformation. It is, therefore, possible to keep the comparatively large mass of the oscillator 1 and evaluation element 3 separate from the substrate by means of only a few spring elements and anchoring means 10.

The sensor shown in FIG. 1 is used as a rotary speed sensor. To that end, the oscillator 1 is excited (as explained below) to oscillate in the X direction. Because of the low spring constant of the oscillator springs 2, only slight forces in the X direction arising from such oscillation are transmitted to the frame 4. Since the frame 4 is relatively stiffly supported in the X direction by the deflection springs 9, only slight deflections of the frame 4, and of the movable electrodes 5, are caused by these forces.

If the sensor is rotated about the Z axis (see FIGS. 1 and 3), then Coriolis forces are created on oscillator 1 at right angles to the direction of oscillation. Thus, they act in the Y direction and are transmitted from oscillator 1 to the frame 4 by the oscillator springs 2, which have a high spring constant in the Y direction. Since the deflection springs 9 have only a low spring constant in the Y direction, these forces in the Y direction cause deflections of the deflection springs 9 and, thus, a displacement of the frame 4 occurs. As a result of the displacement of the frame 4, the spacing between the movable electrodes 5 and the stationary electrodes 6 changes. By measuring the capacitance between the movable electrodes 5 and the stationary electrodes 6, the deflection of the frame 4 can be measured. From this measurement, the Coriolis forces, and the speed of rotation about the Z axis can be ascertained.

Production tolerances thus have only a slight influence on the output signal of the evaluation element 3. If oscillations of the evaluation element 3 were to occur in the X direction, then even slight deviations from a strictly parallel alignment of the electrodes 5, 6 to one another would produce a signal. However, since only motions in the Y direction are possible for electrodes 5 due to spring elements 2 and 9, tolerances in production lead to only a slight influence on the measurement signal.

To excite the oscillations of the oscillator 1, electrostatic comb drives 31, 32 are provided. They have electrostatic electrodes 33, which are secured to the substrate 21 by anchoring means 10 and which cooperate with further electrodes 34 of the oscillator 1. The electrostatic electrodes 33 and the further electrodes 34 form plate capacitors, the capacitance of which changes when the oscillator 1 is displaced in the X direction. By the application of electrical potentials to the electrostatic electrodes 33, force can thus be exerted on the oscillator 1. The two comb drives 31, 32 can be operated such that they each exert an electrostatic force action on the oscillator 1 in push-pull fashion. It is also possible to use only comb drive 31 to excite oscillations of the oscillator 1 and to excite the second comb drive 32 to detect this oscillation by measuring the capacitance between the electrostatic electrodes 33 and the further electrodes 34. The thus-measured oscillation signal can then be used to vary the intensity or frequency of the potentials that are applied to the first drive 31. It will be apparent to one skilled in the art that other drive forms are also possible, for instance by means of piezoelectric or magnetic elements. Other forms of electrode for an electrostatic drive are also possible.

The evaluation element 3 is embodied here as including a plate capacitor formed by electrodes 5 and 6, the capacitance of which changes as a result of the Coriolis forces that occur. Other evaluation elements 3 can be used that operate by a piezoelectric, piezoresistive, or other detection concept. The capacitive evaluation element shown in FIG. 1, however, has the advantage of being especially simple in design and of having high sensitivity. Moreover, the thus-shown sensor, with a capacitive drive for exciting the oscillator 1 and a capacitive evaluation element 3, is especially simple to manufacture.

The production of the sensor of FIGS. 1 and 3 will now be described in conjunction with FIG. 2 and FIG. 3. The sensor has a substrate 21, on which a connecting layer 22 and over that an upper silicon layer 23 are applied. The substrate 21 preferably comprises silicon and the connecting layer 22 preferably comprises silicon oxide. This kind of layer structure is known in semiconductor technology as an SOI (silicon on insulator) wafer. For the substrate 21, however, other materials may also be used. Any material that can be etched away from the upper silicon layer 23 is suitable for the connecting layer 22. The connecting layer 22 is therefore also known as a sacrificial layer in the production of sensors. In FIG. 2, a continuous layer 22 is shown for this purpose. It is also possible, however, to provide the layer 22 only where structures are to be made in the upper layer 23 that are intended to be movable relative to the substrate 21.

An etching mask 24, which may for instance comprise structured photoresist, is applied to the top of the silicon layer 23. The etching mask 24 has the structure of the sensor of FIG. 1. By etching inward, the structure of the etching mask is then transferred to the upper silicon layer 23. Etching of the upper silicon layer 23 is then done, until the connecting layer 22 is laid bare. In a further etching step, the connecting layer 22 is then etched. The etching of the connecting layer 22 is stopped before that layer has been entirely removed below the anchoring means 10. As shown in FIG. 3, the anchoring means 10 are then still firmly connected to the substrate 21 by the connecting layer 22. The connecting layer 22 is etched away completely from beneath the structures of the deflection springs 9, the movable electrodes 5, the frame 4, the oscillator springs 2, and the oscillator 1. In the case of a continuous connecting layer 22, of the kind shown in FIG. 2, the connecting layer 22 is not completely etched out from beneath anchoring means 10 because of their large lateral dimensions. To assure that layer 22 will be reliably etched from beneath the oscillator 1 and frame 4, etching holes 25 are provided, which extend from the top of the silicon layer 23 as far as the connecting layer 22. In FIG. 1, such etching holes 25 are shown by way of example in the central region of the oscillator 1. Such etching holes 25 are also provided for the frame 4 and all the other regions of the oscillator 1. However, these other etching holes 25 have not been shown everywhere in the drawing, for the sake of clarity of illustration.

The rotary speed sensor of FIG. 1 has two evaluation elements 3. The two evaluation elements 3 are designed such that the capacitance of one evaluation element increases (i.e. the spacing between electrodes 5 and 6 decreases) when the capacitance of the other evaluation element decreases (i.e. the spacing between electrodes 5 and 6 increases). Such an arrangement of two capacitive evaluation elements 3 is made especially advantageous by placing the elements 3 in a bridge circuit, for example, which enables simple and yet precise evaluation.

Figure 4:
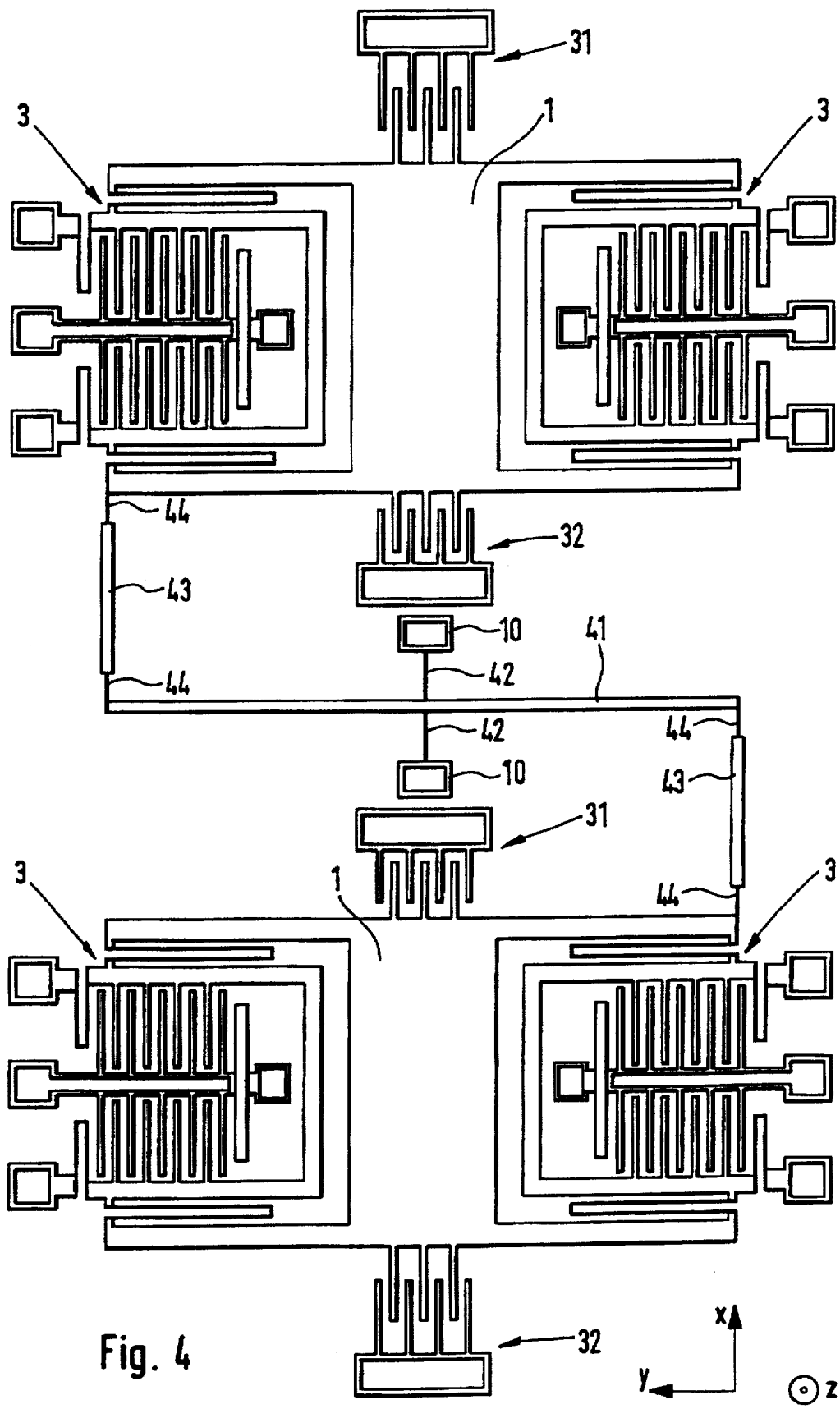
FIGS. 4 and 5 each show a plan view of two further embodiments of the sensor of the invention.

In FIG. 4, a further exemplary embodiment for a rotary speed sensor is shown, which has two oscillators 1, each with two evaluation elements 3 and each with two drives 31, 32. The two oscillators are connected via a bar-like rotary element 41 that is suspended from two rotary springs 42 at anchoring means 10. The rotary element 41 is connected to the two oscillators 1 each via one bar element 43 and one elastic compensation element 44. Rotary element 41, which rotates about a suspension point formed by being suspended from the elastic elements 42, forces the oscillators 1 to oscillate in phase opposition to one another. The elements 42 must be elastic, so as to allow a rotation of the bar 41 about its center point. The connection of the bar 41 to the oscillators 1 by elements 44 must be done elastically because the angle between the rotary element 41 and the oscillators 1 varies. If the rotary element 41 were rigidly connected to the oscillators 1, the rotary element 41 could not rotate.

By means of the bar elements 43, forces in the X direction are transmitted to the rotary element 41. Because of the elastic compensation elements 43, these forces appear as tensile or compressive forces at the ends of the rotary element 41. Because of the rotary springs 42, a rotation of the rotary element 41 about the Z axis (at right angles to the X and Y directions) can be brought about. By means of the rotary element 41, coupling of the oscillations of the two oscillators is thus effected. The oscillations of the two oscillators 1 are controlled to be in phase opposition to one another; that is, when one oscillator oscillates in the positive X direction, the other one oscillates in the negative X direction, and vice versa. Since the Coriolis forces that then occur at the two oscillators 1 have respectively opposite signs, the signal component that is caused by linear acceleration noise in the Y direction can be cancelled by simply deriving the difference between the signals of the two oscillators 1. Thus, if Y is the value of the Coriolis force signal and n is the noise caused by linear acceleration, then (Y+n)−(−Y+n)=2Y.

Figure 5:
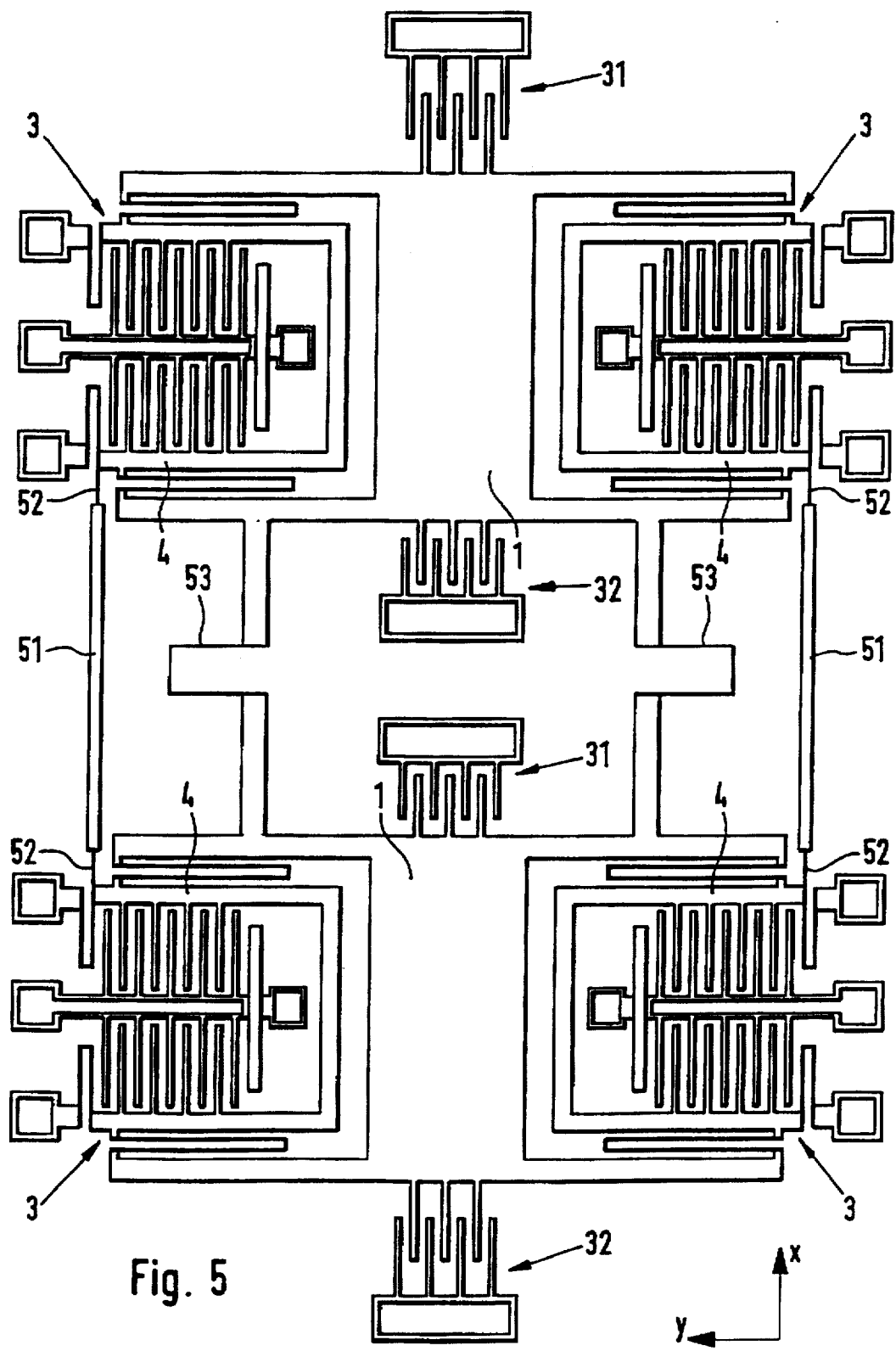

Other forms of coupling are shown in FIG. 5. The oscillations of the two oscillators 1 are coupled to one another via bar-like coupling elements 51, which engage the frame 4 of the evaluation elements 3. The connection of the coupling elements 51 to the frame 4 is effected via elastic compensation elements 52. By means of the coupling elements 51, a coupling of the oscillations of the two oscillators 1 is attained. As a function of the frequency applied to the drives 31, 32, both a phase-opposition oscillation and an in-phase oscillation of the two oscillators 1 can be attained. The phase-opposition oscillation is advantageous because, as explained above, it eliminates the effect of linear acceleration noise. In-phase oscillation is another possible way to operate in order to, for example, increase the output signal produced by the rotary speed sensor, but the phase-opposition mode is preferred.

The coupling elements may also be embodied as springs, in order to separate the resonant frequencies of the in-phase and the phase-opposition oscillation. In the case of the in-phase oscillation, the spring is not deflected, and the resonant frequency is determined only by the oscillator spring (2). For the phase-opposition mode, the coupling spring (53) must be deflected in the X direction, as a result of which the spring constant of the system is increased. In other words, coupling of the two oscillators 1 by a coupling spring 53 causes the in-phase and phase-opposition oscillations to differ in their resonant frequency. This is accomplished by providing that with in-phase oscillation, both oscillators 1 move in the same direction at the same time, such that the spring 53 is not deformed. With phase-opposition oscillation, however, the spring 53 must be deformed, so that for this type of oscillation, the rigidity of the system is increased, and thus the resonant frequency of the two oscillators 1 is also shifted to higher frequencies.

In-phase or phase-opposition oscillation modes can be attained both by the coupling elements 51 and by the springs 53.

Although details of preferred embodiments of the invention have been described above, it will be readily apparent to anyone with ordinary skill in the art that various changes and modifications can be made thereto, and features described in connection with any one of the embodiments may be used with any of the others, without departing from the scope of the present inventive as defined by the following claims.

I claim:

1. A rotary speed sensor, comprising:
    at least one oscillator (1) and a substrate (21), wherein the oscillator can be excited to perform oscillations relative to the substrate in a first direction (X direction) and, upon a rotation, can be deflected by incident Coriolis forces in a second direction (Y direction) that is perpendicular to the first direction;
    at least one elastic element (2) coupling the oscillator to at least one detection element (3), wherein the elastic element (2) has a low spring constant in the first direction (X) and a high spring constant in the second direction (Y); and
    at least two deflection springs (9) anchoring the at least one detection element (3) to said substrate (21), wherein the deflection springs (9) have a high spring constant in the first direction (X) and a low spring constant in the second direction (Y).

2. The rotary speed sensor of claim 1, wherein the detection element (3) detects forces in the second direction (Y).

3. The rotary speed sensor of claim 2, wherein the detection element (3) includes a frame (4), on which the deflection springs (9) are secured, and movable electrodes (5) are secured to the frame (4) and disposed opposite stationary electrodes (6) that are anchored to the substrate (21).

4. The rotary speed sensor of claim 3, wherein electrostatic drives (31, 32) are provided for exciting the oscillations of the oscillator (1); electrostatic electrodes (33) being anchored to the substrate (21) by anchoring means (10); and the oscillator (1) further comprising electrodes (34) which, together with the electrostatic electrodes (33), form plate capacitors.

5. The rotary speed sensor of claim 2, wherein the substrate comprises silicon.

6. The rotary speed sensor of claim 1, wherein each of the oscillator (1) and the detection element (3) is comprised of one of silicon and a metal.

7. The rotary speed sensor of claim 1, wherein at least two oscillators are provided, and the oscillators are mechanically coupled together.

8. The rotary speed sensor of claim 7, further comprising a rotary element (41) which is rotatable about an axis at right angles to the first and second directions, and the two oscillators are joined to the rotary element (41) by bar elements (43).

9. The rotary speed sensor of claim 7, wherein each of said two oscillators has an associated detection element, and the detection elements (3) of the two oscillators are joined together by a barlike coupling element (51).

10. The rotary speed sensor of claim 7, wherein each of said two oscillators has an associated detection element, and the detection elements (3) of the two oscillators are joined together by a spring (53).

11. The rotary speed sensor of claim 1, wherein electrostatic drives (31, 32) are provided for exciting the oscillations of the oscillator (1); electrostatic electrodes (33) being anchored to the substrate (21) by anchoring means (10); and the oscillator (1) further comprising electrodes (34) which, together with the electrostatic electrodes (33), form plate capacitors.

* * * * *